(12) United States Patent  
Schoepe et al.

(10) Patent No.: US 8,899,404 B2  
(45) Date of Patent: Dec. 2, 2014

(54) ADAPTABLE SCREENING CHECKPOINT

(75) Inventors: Hans Joachim Schoepe, Taunusstein (DE); Stefan Aust, Idstein (DE); Kristofer Roe, Port Deposit, MD (US); Jason Dylan Gash, Cocoa Beach, FL (US)

(73) Assignee: Smiths Heimann GmbH, Wiesbaden (DE)

( * ) Notice: Subject to any disclaimer, the term of this patent is extended or adjusted under 35 U.S.C. 154(b) by 111 days.

(21) Appl. No.: 13/569,650

(22) Filed: Aug. 8, 2012

(65) Prior Publication Data
US 2013/0126299 A1      May 23, 2013

Related U.S. Application Data

(60) Provisional application No. 61/523,035, filed on Aug. 12, 2011.

(51) Int. Cl.
| | | |
|---|---|---|
| *B65G 37/00* | (2006.01) | |
| *B65G 43/08* | (2006.01) | |
| *G06T 7/00* | (2006.01) | |
| *G01V 5/00* | (2006.01) | |

(52) U.S. Cl.
CPC .............. *B65G 43/08* (2013.01); *G06T 7/0002* (2013.01); *G01V 5/0083* (2013.01)
USPC ........................................... 198/358; 198/349

(58) Field of Classification Search
USPC .......... 198/358, 348, 349, 351, 580; 382/100, 382/103
See application file for complete search history.

(56) References Cited

U.S. PATENT DOCUMENTS

| | | | |
|---|---|---|---|
| 7,012,256 B1 | 3/2006 | Roos et al. | |
| 7,270,227 B2 * | 9/2007 | Bender et al. ................ | 198/358 |
| 7,686,154 B2 | 3/2010 | Henkel et al. | |
| 8,474,595 B2 * | 7/2013 | Crass et al. .................. | 198/358 |
| 8,678,169 B2 * | 3/2014 | Baker et al. .................. | 198/358 |
| 2003/0128806 A1 * | 7/2003 | Morrell ........................... | 378/57 |
| 2007/0083414 A1 | 4/2007 | Krohn et al. | |
| 2007/0280502 A1 | 12/2007 | Paresi et al. | |

FOREIGN PATENT DOCUMENTS

| | | |
|---|---|---|
| DE | 102009048770 | 4/2011 |
| WO | 2009/106857 | 9/2009 |
| WO | 2011/042109 | 4/2011 |

OTHER PUBLICATIONS

International Search Report and Written Opinion for PCT Application No. PCT/US2012/049945, mailed Feb. 26, 2013.
International Publication No. WO 2011/042109, published Apr. 14, 2011 is the English equivalent of DE 102009048770.

* cited by examiner

*Primary Examiner* — James R Bidwell
(74) *Attorney, Agent, or Firm* — Casimir Jones S.C.

(57) ABSTRACT

The present disclosure provides systems, methods, and devices for efficient passenger belonging screening at security checkpoints. In certain embodiments, the present invention provides systems, methods, and devices for tracking, analyzing, and collecting information in order to improve efficiency at security checkpoints.

25 Claims, 5 Drawing Sheets

ADAPTABLE SCREENING CHECKPOINT

CROSS-REFERENCE TO RELATED APPLICATIONS

The present invention claims the benefit of U.S. Provisional Patent Application No. 61/523,035, filed Aug. 12, 2011, which is incorporated by reference in its entirety.

FIELD

The present disclosure provides systems, methods, and devices for efficient passenger belonging screening at security checkpoints. In certain embodiments, systems, methods, and devices for tracking, analyzing, and collecting information in order to improve efficiency at security checkpoints are disclosed.

BACKGROUND

For security screening of hand luggage and other items carried by persons, for example for security screening at airports, inspection stations use X-ray inspection devices that transradiate the items. The items to be screened are conveyed on a conveyor, typically a conveyor belt, through the inspection unit, which is run by an operator. Located at the entry side ahead of the conveyor is a roller conveyor, which is used for depositing the items to be screened. In a similar manner, a roller conveyor from which the screened items can be retrieved is located at the output side following the conveyor.

SUMMARY OF THE INVENTION

The present disclosure provides systems, methods, and devices for efficient passenger belonging screening at security checkpoints. In certain embodiments, systems, methods, and devices for tracking, analyzing, and collecting information in order to improve efficiency at security checkpoints are described. In some embodiments, the systems and methods employ remote electronic communication to remote screening systems (e.g., whether present in the same facility, geographic location or not). In some embodiments, provided herein are adaptive checkpoint systems and methods that support remote operation of a checkpoint in concert with local detection systems (e.g., automatic detection systems). In some embodiments, the systems and methods provide functions optimized to run automatically and/or adaptively to achieve more efficient (e.g., time efficient, cost efficient, human resource efficient) screening at security checkpoints.

In certain embodiments, the systems further comprise a computer system, wherein the computer system comprises a processor and a memory component, wherein the memory component comprises software for receiving, storing, and delivering images to a remote viewing station. In some embodiments, the computer system is configured to monitor, record, store, analyze, and/or control one or more parameters of one or more inspection systems including, but not limited to, flow of bins through inspection systems, transmission of images to and from local or remote reviewers, sequestering of objects identified as threats or for further inspection, locations/operation status of system components (e.g., modular system components), location and activity of human operators (e.g., image reviewers, inspection system attendants, etc.).

In some embodiments, the system provides command and control functions that permit people and/or devices (e.g., automated devices) to manage efficiency in real-time and/or to assess prior activities to select and implement improved efficiencies in the future. For example, such information can be employed to decide whether to open or close particular inspection system lines, or to determine when personnel should be added, given breaks, or moved from one station to another (e.g., from a position near the inspection line to a remote viewing station). Likewise, when such a decision is made, the computer system is adaptable to adjust one or more parameters based on changes in system or personnel. Such information can also be used to determine if additional modules should be added or removed to the conveyor system to allow more or less time for images to be reviewed by screeners and the system can adapt to such changes.

In some embodiments, inspection systems comprising: a plurality of transport bins, wherein each of the transport bins comprises a traceable tag with a unique signature, wherein the transport bins are configured for carrying passenger belongings; an inspection unit configured to individually scan each of the plurality of transport bins to generate images of the passenger belongings, wherein each of the images is associated with a unique signature from the traceable tag; a conveyor system extending through the inspection unit for conveying the transport bins through the inspection unit; a deposit point located ahead of the conveyer; a retrieval point located behind the conveyor; and a computer system configured to: transmit the images and the unique signature to a remote inspection station; receive information from the remote inspection station that identifies a threat in the images; monitor transport bin flow through the deposit and retrieval points; identify presence of, number of, and/or location of one or more modular components located in the conveyor system, the deposit point, and the retrieval point; and/or v) adjust one or more system performance parameters based on the presence of, number of, and/or location of the modular components. In particular embodiments, the computer systems comprise a database for storing images and other parameters related to checkpoint operation. In particular embodiments, the computer systems adaptively process information received from the checkpoint.

In certain embodiments, the traceable tag comprises an RFID tag. In other embodiments, the conveyor system comprises a buffering area extending between the inspection unit and the retrieval point, wherein the buffering area is inaccessible to a passenger attempting to retrieve their passenger belongings. In further embodiments, the buffering area comprises one or more modular components that can be removed and added to shorten or lengthen the distance between the inspection unit and the retrieval point, thereby altering when the transport bins arrive at the retrieval point and are accessible by the passenger.

In particular embodiments, the conveyor system comprises a staging area extending between the inspection unit and the deposit point, wherein the staging area is inaccessible to a passenger attempting to retrieve their passenger belongings. In certain embodiments, the staging area comprises one or more modular components that can be removed and added to shorten or lengthen the distance between the deposit point and the inspection unit, thereby altering the time when the transport bins arrive at the inspection unit.

In some embodiments, the systems further comprise a return conveyor for the transport bins arranged next to or below the conveyor passing through the inspection station, the return conveyor extending to the area of the deposit point ahead of the conveyor. In other embodiments, the system further comprises a recheck station. In other embodiments, the conveyor system further comprises a bin diversion system configured to automatically divert the transport bins identified as suspicious to the recheck station. In some embodiments, the computer system manages transfer of the images to the remote inspection station based on reviewer workflow. In further embodiments, the computer system transfers an image to a second reviewer if a first reviewer is occupied with a previous image. In other embodiments, the computer system is in electronic communication with a plurality of inspection units. In further embodiments, the plurality is two to four inspection units.

In some embodiments, the present disclosure provides inspection systems comprising: a plurality of transport bins, wherein each of the transport bins comprises a traceable tag with a unique signature, wherein the transport bins are configured for carrying passenger belongings; an inspection unit configured to individually scan each of the plurality of transport bins to generate images of the passenger belongings, wherein each of the images is associated with a unique signature from the traceable tag; a conveyor system extending through the inspection unit for conveying the transport bins through the inspection unit; a deposit point located ahead of the conveyer; a retrieval point located behind the conveyor; and a computer system configured to: transmit the images and the unique signature to a remote inspection station; receive information from the remote inspection station that identifies a threat in the images; monitor transport bin flow through the deposit and retrieval points; and/or adjust image transmission parameters to remote inspection stations in response to changes in bin flow.

In certain embodiments, the changes in bin flow are caused by increased bins traffic. In further embodiments, the image transmission parameters are based on review time of images by reviewers. In further embodiments, the review time comprises average review time per image. In other embodiments, the review time comprises minimum and maximum review times recorded for individual images. In additional embodiments, the changes in bin flow are caused by reassignment of image reviewers or inspection station attendants. In certain embodiments, the changes in bin flow are caused by opening or closing of one or more inspection stations. Any number of additional factors may be assessed (e.g., communication latency, etc.).

In some embodiments, methods are disclosed for scanning passenger belongings comprising: transporting passenger belongings in a transport bin through an inspection unit using a system described herein; generating an image of the belongings; and assessing a threat profile of the belongings.

In some embodiments, computer systems are disclosed for managing a passenger checkpoint the computer system comprising: a computer processor, and computer memory, wherein the computer memory comprises a software application configured for processing images from a passenger check point which comprises a plurality of inspection systems and a remote viewing station; wherein the processing images by the software application comprises: receiving the images from the plurality of inspection systems, storing the images, and one or more or all of additional functionalities selected from: transmitting the images to a plurality of human screeners at the remote viewing station such that the next available human screener receives the next available image regardless of which of the plurality of inspection systems generated the image; receiving images from the remote viewing station and transmitting the images to the recheck station, wherein the images have been marked-up at the remote viewing station to identify suspicious items; identifying presence of, number of, and/or location of one or more modular components located associated with the inspection system; adjusting one or more system performance parameters based on presence of, number of, and/or location of modular components associated with the inspection system; and managing image transmission parameters to remote inspection stations in response to changes in bin flow through the inspection system.

In some embodiments, the systems and methods employ a user interface to allow an operator to control one or more parameters of the system. For example, in some embodiments, a menu driven user interface is provided to allow the operate to monitor, analyze, or adjust any of the parameters.

In some embodiments, the system provides decision support systems comprising a security checkpoint and a computer system: wherein the security checkpoint comprises a plurality of inspection systems configured for screening belongings, wherein each of the inspection systems comprises: a plurality of transport bins, wherein the transport bins are configured for carrying passenger belongings; an inspection unit configured to individually scan each of the plurality of transport bins and the passenger bags to generate images; a conveyor system extending through the inspection unit for conveying the transport bins and the passenger bags through the inspection unit; a deposit point located ahead of the conveyer; a retrieval point located behind the conveyor; and an operator notification device; and wherein the computer system comprises a processor and memory component, wherein the memory component comprises a software application configured to: collect information from each of the plurality of inspection systems as to the number of transport bins passed through each of the inspection systems; process the number information to generate throughput data comprising the rate at which the passenger bags and transport bins are being passed through each of the plurality of inspection systems; and transmit the throughput data to the operator notification device.

In certain embodiments, the information is generated by the inspection unit (e.g., based on the number of images generated). In other embodiments, each of the plurality of inspection systems comprises at least one sensor configured to detect the number of transport bins and passenger bags passing through the inspection systems, and wherein the number information is generated by the at least one sensor. In further embodiments, each of the plurality of transport bins comprises a traceable tag with a unique signature, and the at least one sensor is configured to detect the unique signature.

In some embodiments, the security checkpoint further comprises a remote viewing station configured to allow human viewers to review the images generated by the inspection unit. In particular embodiments, the software application is further configured to: collect review information from the remote viewing station as to the number of the images reviewed by the human screeners and number of un-reviewed images; process the review information generate image review data comprising the rate at which the images are processed by the remote viewing station; process the image review data in combination with the throughput data to generate review capacity data; and transmit the review capacity data to the operator notification device. In certain embodiments, the review capacity data indicates a bottleneck, or potential future bottleneck, at the one or more inspection systems due to too few human viewers. In particular embodiments, the review capacity data indicates an over-capacity, or potential future over-capacity, of human viewers at the remote viewing system. In some embodiments, the review capacity data provides a recommendation to conduct an ameliorative action selected from the group consisting of: adding or removing human viewers from the remote viewing station, opening or closing an inspection system, redirecting passenger flow, adjusting length of inspection system, and reassigning personnel.

In particular embodiments, the software application is further configured to: collect waiting passenger information from each of the plurality of inspection systems; process the waiting passenger information in combination with the throughput data to generate expected flow-through data; and transmit the expected flow-through data to the operator notification device.

In other embodiments, the expected flow-through data comprises recommendations for diverting passengers from one of the inspections systems to another. In other embodiments, the operator notification device is a hand-held device comprising a display screen (e.g., at text message to a cell phone or other hand held device). In certain embodiments, the operator notification device is a user interface screen at a manager computer station. In further embodiments, the throughput data further comprises recommendations regarding the closure or addition of one or more of the plurality of inspection systems. In particular embodiments, the recommendation is based on exceeding a threshold level of inspection system capacity. In some embodiments, the recommendation is based, at least in part, on stored prior performance outcome data. In further embodiments, the throughput data further comprises recommendations or warnings regarding increased or decreased needs for personnel. In other embodiments, the recommendation is based, at least in part, on stored prior performance outcome data. In particular embodiments, the recommendation is based on exceeding a threshold level of personnel capacity.

In certain embodiments, the throughput data further comprises recommendations or warnings regarding increased or decreased needs for human screeners at the remote viewing site. In other embodiments, the security checkpoint further comprises a command and control station, and wherein the computer system is located in the command and control station. In some embodiments, the conveyor system is modular such that it can be lengthened or shortened with the addition or subtraction of modules, and wherein the throughput data comprises recommendations for adding or removing the modules from the conveyor systems.

In certain embodiments, provided is computer systems for managing a passenger checkpoint comprising: a computer processor, and computer memory, wherein the computer memory comprises a software application configured for processing information from a passenger check point which comprises a plurality of inspection systems as recited herein; wherein the processing images by the software application comprises: collecting information from each of the plurality of inspection systems as to the number of transport bins passed through each of the inspection systems; processing the information to generate throughput data comprising the rate at which the transport bins are being passed through each of the plurality of inspection systems; and transmitting the throughput data to the operator notification device.

DETAILED DESCRIPTION

The present disclosure provides systems, methods, and devices for efficient passenger belonging screening at security checkpoints. In certain embodiments, the present invention provides systems, methods, and devices for tracking, analyzing, and collecting information in order to improve efficiency at security checkpoints.

The present disclosure provides systems, methods, and devices for efficient passenger belonging screening at security checkpoints. In certain embodiments, the disclosure provides: transport bins associated with traceable tags, such as traceable tags with a unique signature that are attached or otherwise integrated with the bins, and methods and systems for using such bins in inspection systems (e.g., so x-ray images generated of the contents of the bins are associated with the bins); conveyor systems with modular components that can be removed or inserted to change the length of the conveyor system, and computer systems and software applications configured to: process images to increase efficiency at remote reviewing stations and to transmit marked-up images to a recheck station; and provide recommendation for managing personal and increasing efficiency at security checkpoints. In particular embodiments, the disclosure describes computer systems that can collect and process data from the system (e.g., location of bins, speed of bins through system, number of personnel and locations, personnel qualifications, number of lanes open, etc.) and display information and/or provide recommendations to managers to increase efficiency (e.g., to allow decision to be made to increase number of modules in conveyor system to give remote viewers more time to review images prior to the passenger retrieving their belongings). Further, as changes are implemented, the system can adapt for future operations. For example, if a modular components is added to a portion of the system to allow more time for data collection and screening (e.g., to avoid backups, including but not limited to halted screening), the system can account for the presence of the added modular component in managing information flow (e.g., timing of image transmission to and from remote review locations).

Provided below is a description of the various components that may be included in a passenger inspection system or station. One such system described in U.S. Pat. No. 7,686, 154, which is herein incorporated by reference in its entirety.

Figure 1:
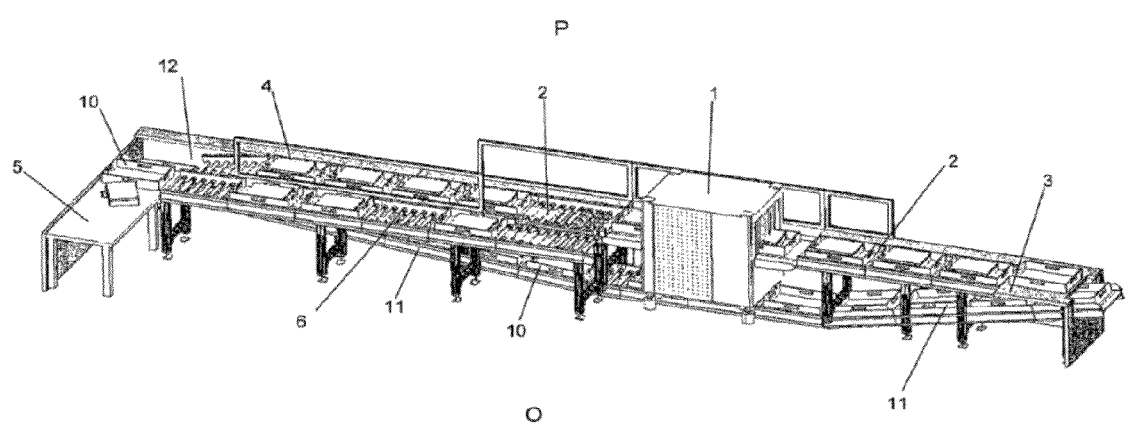
FIG. 1 shows an oblique view of an inspection station with a return conveyor for transport bins located beneath the inspection unit.
Figure 2:
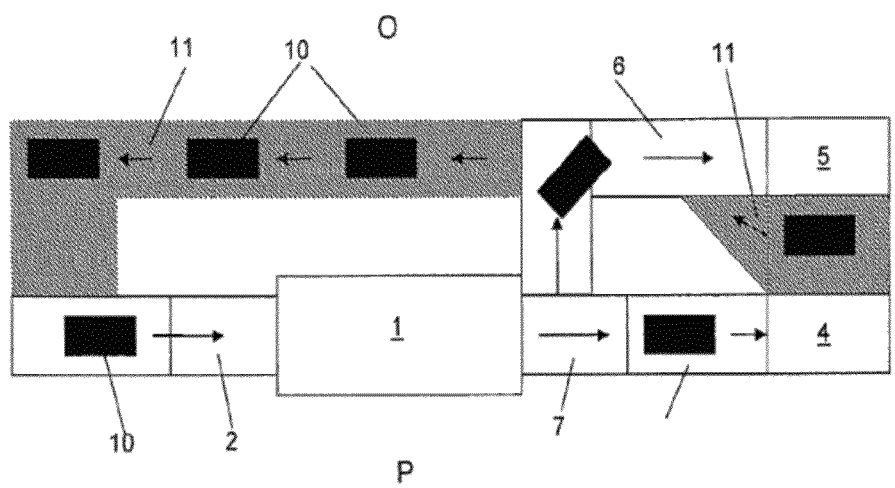
FIG. 2 shows a top view of an embodiment in which bins are conveyed back in a lying position next to an inspection unit.
Figure 3:
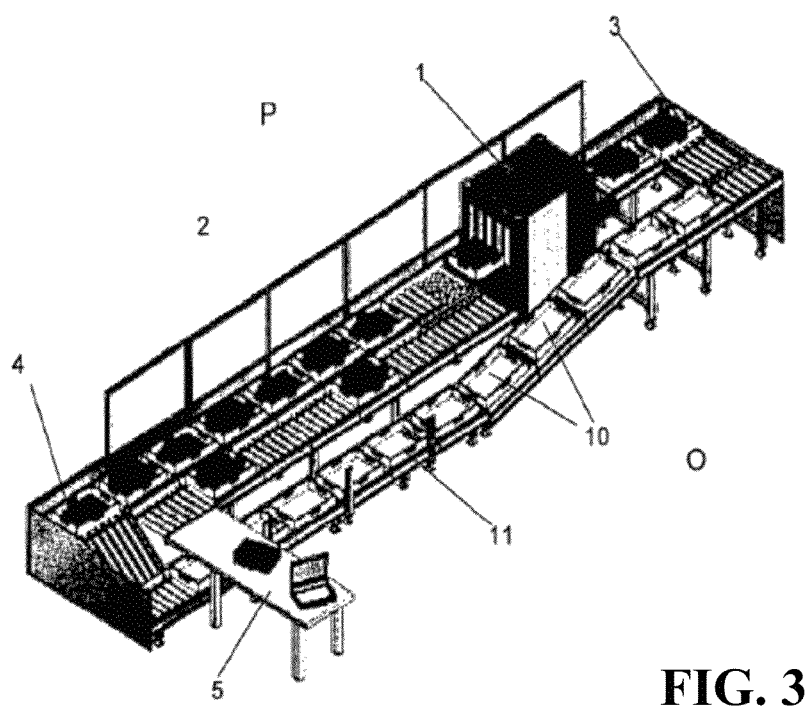
FIG. 3 shows an oblique view of the embodiment from FIG. 2.

FIGS. 1-3 discuss exemplary components that may be employed in the inspection system provided herein. These figures are described below.

The inspection systems represented in FIGS. 1-3 are used for screening hand luggage and other articles carried by persons. They can be used for security screening at airports in order to screen passengers' carry-on items for weapons, explosives, or other impermissible items. An inspection station can contain an inspection unit 1, an X-ray inspection device, used to transradiate the carried items. The items to be screened are conveyed on a conveyor 2, such as a belt conveyor, through the inspection unit. Located at the entry side of the inspection station, ahead of the conveyor 2, is a deposit point 3, upon which the items to be screened are deposited and delivered to the conveyor 2. Customarily, the deposit point 3 has a roller section with freely rotating rollers. At the output side, the conveyor 2 is adjoined by a retrieval point 4, where the passengers retrieve the screened items. The retrieval point 4 also typically has a roller section with freely rotating rollers to which the screened items are delivered from the inspection unit 1 by the conveyor 2. A recheck point 5 is located next to the retrieval point 4, to which the items are delivered by an alternative conveyor 6 behind the inspection unit if the screening by the inspection unit 1 is not clear, so that a manual recheck in the presence of an operator may be performed.

In embodiments, located next to the inspection unit 1 on the operator side O is the operator's terminal for the operator, containing a screen which displays the results of the transradiation. The recheck point 5 is likewise located on the operator side, so that the operator can reach it quickly for a follow-up inspection. A switch point 7 in the conveyor section 2, which can be actuated by the operator or automatically, makes it possible to switch over to the conveyor section 6, so the items are conveyed to the recheck point 5 instead of to the retrieval point 4.

The passengers can move through the inspection station on the side P opposite the operator side O. Thus, the luggage retrieval point 4 can located on the passenger side P.

Transport bins 10 are used for transporting, for example, carry-on luggage, small items (e.g., wallets, cell phones, laptops, small backpacks, etc.) and articles of clothing through the inspection unit 1, with these items and articles of clothing being placed in the bins. The transport bins 10 can be placed on the rollers of the deposit point 3, where the passengers place the small items and clothing in the bins 10. After the screening in the inspection unit 1, the passengers remove the screened items from the bins 10 again at the retrieval point 4.

In certain inspection systems, a return conveyor 11 for the empty transport bins 10 is arranged next to or below the conveyor 2 passing through the inspection unit 1, and extends from the retrieval point 4 to at least the area of the deposit point 3 ahead of the conveyor 2. The transport bins 10 are automatically conveyed from the end of the screening section back to the beginning of the screening section by the return conveyor 11. It is not necessary for an operator to carry the transport bins 10 back or manually push them back on a roller conveyor. The time and physical demands on the operating personnel are thus reduced considerably in such embodiments.

Shown in FIG. 1 is an embodiment in which the return conveyor 11 is arranged to run beneath the conveyor 2 and the inspection station 1. The return conveyor 11 contains driven belts or rollers and has a transport width at least as wide as the transport bins 10. The transport bins 10 can in this way be transported back lying flat, in order to keep the height required beneath the inspection unit 1 and conveyor 2 as small as possible. The transfer point 12 at the end of the screening section, where the emptied bins 10 are transferred by the conveyor 2 to the return conveyor 11, contains either freely rotating or driven rollers. In the case of freely rotating rollers at the transfer point 12, either an operator or the passenger pushes the empty bins 10 onto the return conveyor 11. In the case of driven rollers at the transfer point 12, the transfer can take place automatically, for example initiated by an operator. The transfer of the empty transport bins 10 from the return conveyor 11 to the deposit point 3 at the start of the screening area is either done manually by an operator or the passenger himself, or suitable conveying means that can be activated by an operator are arranged at this point.

Shown in FIGS. 2 and 3 is another embodiment, in which the return conveyor 11 for the bins 10 is arranged to run next to the conveyor 2 on the operator side O. Also shown in both FIGS. 2 and 3 are the recheck point 5 and the switch point 7 with the conveyor 6 leading to the recheck point 5. In this embodiment, too, the bins 10 are transported back lying flat. The return conveyor 11 begins between the retrieval point 4 and the recheck point 5, and initially runs at a level lower than the conveyors 2 and 6. This lower level is drawn with cross-hatching in the figures. Located between the retrieval point 4 and the recheck point 5 is a downwardly angled conveyor surface leading to the return conveyor 11, on which surface the transport bins 10 slide downward to the return conveyor 11. The return conveyor 11 runs on the operator side until it is alongside the deposit point 3. In its final conveying section, it rises to the level of the deposit point 3, so that a bin 10 can simply be pushed from the end of the return conveyor 11 to the deposit point 3.

Provided herein are modular checkpoint and remote viewing systems and methods. In certain embodiments, the modular designs are provided where the entrance and exit rollers or other components can be added to the desired lengths and entrance/exit angles (e.g., to provide efficient work flow, and to give additional time to review images of a passengers belongings). In certain embodiments, a computer system can monitor, adjust to (or recommend) changes that are made to a security checkpoint and remote viewing station. For example, a computer system may monitor or adaptively adjust to an extra screener being added to a remote viewing station (e.g., computer system can increase the number or speed at which images are sent to a remote viewing station). Monitoring and processing by the computer system can increase efficiency, such that, for example, additional lanes may not need to be opened. The computer systems can be adjusted in any way without a reboot (e.g., in certain embodiments, failsafe measures are implemented where, if the remote viewing location shuts down, the local operators can take control of the x-ray systems without the need of a reboot). In certain embodiments, the bins have tracking tags, such as RFID tags that can be attached or integrated with the bin. In other embodiments, the return of bins subsequent use is automated. For example, bins can be returned to the point of deposit for reuse.

In certain embodiments, the inspection unit is configured to generate x-ray images. An example x-ray system is HI-SCAN™6040ATIX (SMITHS GROUP). In other embodiments, networking computer systems are employed. An example networking computer is a small, modular networking computer the is configured to permit remote screening, designed to work with a predetermined number of x-ray systems (e.g., four), connected to x-ray system by Ethernet/fiber. Another example of a networking computer is the MATRIX™ Server (SMITHS GROUP), which is a large networking system that allows for remote screening, designed for large check points of four or more x-ray systems, connected by Ethernet/Fiber.

In certain embodiments, provided herein are systems and methods for improving the operation and reducing the footprint, at the checkpoint by using a modular system that automates the flow of bins/luggage/passengers. Modular systems can be employed to take advantage of the available space at a given checkpoint, as well as adjusting the system to a particular workflow to maximize efficiency (e.g., reduce on-site inspectors, reduce cost, prevent/reduce backlogs). When passengers arrive at the beginning of the checkpoint the bins can be available and ready for use via an auto bin return system. Checkpoints can be designed to include a bag/bin separator to provide the spacing so that the tag (e.g., RFID) in the bin can be assigned to the screened image. Once an image is scanned and while it is being reviewed the corresponding physical objects (e.g., bin and/or bag, and so forth) can be in a buffering area which is the exit side of the x-ray system but before the passenger can retrieve the bin. If the bag/bin item is reviewed and determined to be suspect or selected for additional screening (whether random or based on a factor) the bag/bin diversion system can move the bag/bin to the review area to be checked by another or different screening device and/or screener personnel. Once in secondary area the local screen can have access to the bag image via the secondary screening area monitor. Once cleared by secondary screening or if no secondary screening was needed the passenger may remove their items and the bin can be returned whether automatically or manually back to the front of the checkpoint. Analyst software can be employed to mark the suspect area and send that information to the AVS (alternate viewing station).

In certain embodiments, provided herein are systems and methods that increase efficiency at security checkpoints. In particular, central command and control computers (e.g., comprising a database) are provided that can collect, store, and disseminate information collected from a checkpoint to increase efficiency. Information collected can include the location of bins, number of security personnel operating the inspection systems, qualifications and/or function of personnel, number of personnel in remote viewing stations, number of x-ray or other images being generated per time period, length of time needed for review of images, the checkpoint's current configuration, etc. Such information can be displayed to personnel to make decisions such as increasing personnel at particular locations, adding modules to the conveyor system, giving personnel breaks or requesting additional personnel, whether lanes should be opened or closed, etc. In particular embodiments, the computer systems provide recommendations rather than, or in addition to, displaying information to users (e.g., recommendations regarding the number or location of personnel, whether lanes should be opened or closed, whether modules should be added or removed from the conveyor system, etc.). For example, in some embodiments, systems provide recommendations such as, in a four lane checkpoint system, the addition of a 5th remote screener equals an increase of screening capacity from 150 passengers to 190 passengers per hour per lane which in turn will reduce the need for an additional lane to be opened. The computer systems can also provide recommendations such as adjusting the locations and/or function of the screeners during different times to better manage bottle necks (e.g., add additional remote screeners, AVS).

In certain embodiments, provided herein are methods and systems for remote screening. The remote screening area may be connected to the x-ray systems by standard Ethernet cables and switches/routers using AES-128. A scanned image is sent automatically to a remote screening area located a certain distance away where a screener reviews the images and give a 'cleared/recheck' back to the system so that the bin is either sent to the secondary screening area or directly to the passenger for collection. The remote screening area may have one to one screening station so the operator is responsible for one inspection unit (e.g., x-ray system) at a time or the screener can have a buffering system that will send them an image from any system that is ready (e.g., thereby accounting for variable review speeds of different reviewers and to avoid downtime for screeners, which can allow fewer screeners to be employed). In certain embodiments, there can be an addition of a overflow screener in times of higher volumes that can help with the image reviewing and prevent the need to open an additional lane by increasing the flow through the existing lanes. In case of a network failure or other connectivity issue the system may seamlessly hand control over to the onsite screeners or remote screeners, without the need of a reboot or stoppage of screening (e.g., done by supervisor level or higher).

In certain embodiments, images (e.g., AT images) are transmitted over distance of greater than 100 meters, at AES-128 level encryption. For example, either fiber optics or Ethernet/switches/routers are used to allow for transmission of images greater than 100 meters. In certain embodiments, the system and methods provide for the display of the image to an operator in a remote location and provide a decision outcome on that image back to the originating device.

Figure 4:
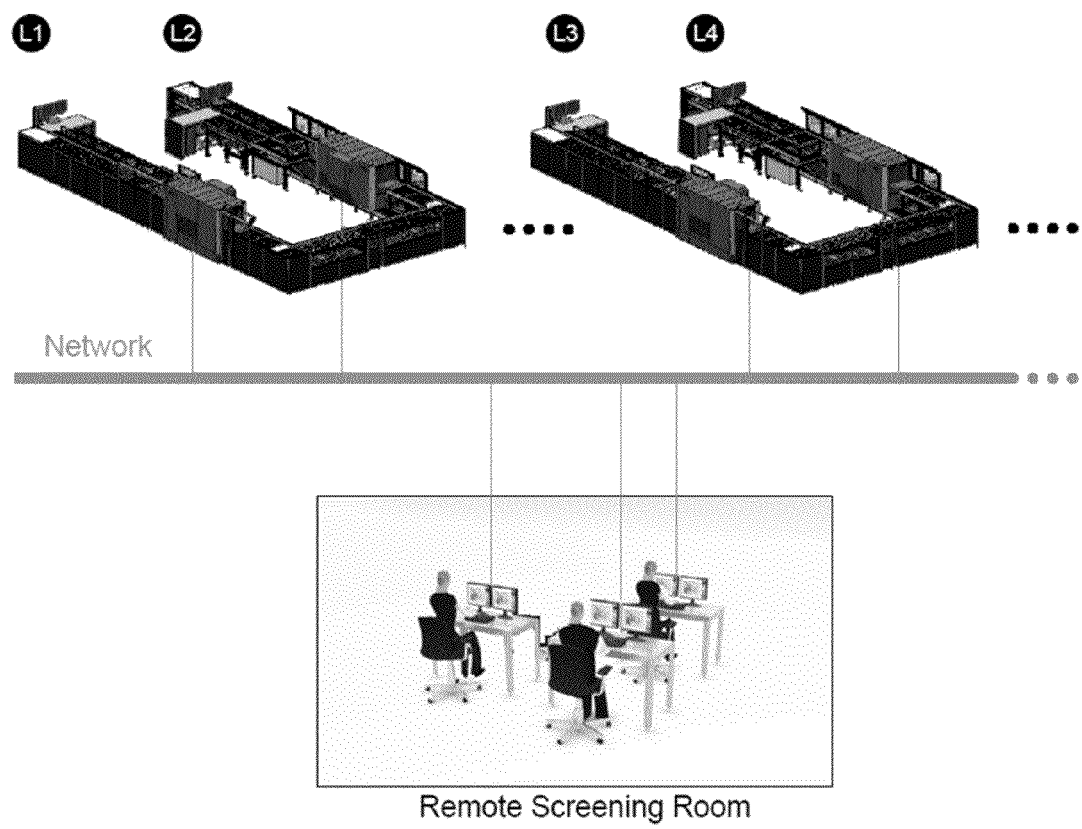
FIG. 4 shows a modular networked checkpoint design, where four inspection stations systems (with 90 degree approach) are employed for remote screening using a networked computer.
Figure 5:
FIG. 5 shows an exemplary modular inspection system design.

In particular embodiments, a networking computer is employed. For example, a unit that manages four x-ray units is used to send the scanned images to a remote screener for review. That remote screener provides a cleared/rejected indication that is sent back to the x-ray unit. If the bin/bag is rejected, the exit side conveyor systems divert such as by kicking or moving the bin/bag to the recheck area where the recheck operator views the corresponding image along with a box placed around the threat area that was provided by the remote screener to help facilitate the inspection of the bag. If the bag is given a 'cleared' indication it moves down the conveyor systems and is available for retrieval by the passenger. FIG. 4 shows a modular networked checkpoint design, where four inspection stations systems (with 90 degree approach) are employed for remote screening using a networked computer. In certain embodiments, a first modular option is employed (e.g., in the U shaped checkpoint shown in FIG. 5) if the AVS (alternate viewing station) is not a bottle neck point there can be one recheck operator per two lanes thus reducing FTE's. In other embodiments, a second modular option is employed (e.g., in the below U checkpoint shown in FIG. 5) if the AVS is a bottle neck point, one can add an AVS to each lane thus decreasing review times and increase throughput.

In certain embodiments, a networking computer is employed that can accommodate five or more lanes. For example, the MATRIX Server (SMITHS GROUP) is a 5 or more x-ray unit dedicated server approach. Using such a server helps to prevent failures, introduce redundancies, and increase reliability. Such systems also sends the scanned images to a remote screener for review and that remote screener provides a cleared/rejected indication that is sent back to the x-ray. If the bin/bag is rejected the exit side conveyor systems 'kicks/moves/diverts' the bin/bag to the recheck area where the recheck operator views the corresponding image along with a box placed around the threat area that was provided by the remote screener to help facilitate the inspection of the bag. If the bag is given a 'cleared' indication it moves down the conveyor systems and is available for retrieval by the passenger. In certain embodiments, such network computers provide the capability to multiplex images from AT devices to available viewing stations.

In certain embodiments, the network computers are configured in several different ways to accommodate the needs of the remote screeners. For example, in a one to one approach, the remote screeners receive images from only one inspection unit (e.g., x-ray device). Also for example, in a one-to-many approach, all of the remote screeners can receive images from any inspection (e.g., x-ray) unit, which allows for the next available remote screener to receive the next available image. During peak times, for example, there can be an additional remote viewing station that is turned on and can start receiving images to review seamlessly. This offers the ability to increase the passengers handled per checkpoint and will reduce the need to open an additional lane.

Figure 6:
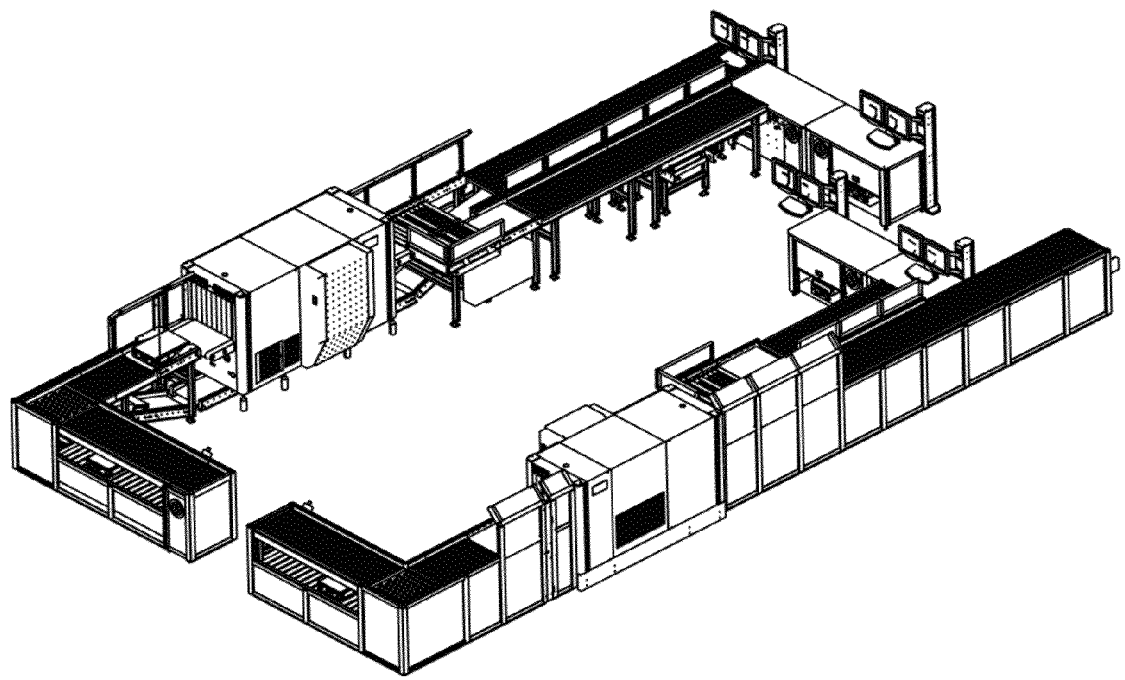
FIG. 6 shows an alternative checkpoint design, showing a straight system.

In certain embodiments, provided herein is a modular system that allows modules (such as M3 and M6 in FIG. 5) to be inserted and removed (e.g., to increase or decrease the amount of time the passenger does not have access to their belongings). FIG. 6 shows an alternative checkpoint design, showing a linear system.

In certain embodiments of the present invention, respective bins used in the inspection system include an RFID tag and that RFID # is assigned/attached to the image (e.g., x-ray image) scanned. In some embodiments, each image (known as a HIF) contains the date/time/serial#/RFID# for tracking purposes. If for any reason an item is not placed in a bin the x-ray system is automatically assigns it a number that is also attached to the HIF.

In embodiments, these systems, including their components, operate under computer control. For example, a processor is included with or in the system and/or its components and functions described herein using software, firmware, hardware (e.g., fixed logic circuitry), manual processing, or a combination thereof. The terms "controller" "functionality," "service," and "logic" as used herein generally represent software, firmware, hardware, or a combination of software, firmware, or hardware in conjunction with controlling the system and/or its components. In the case of a software implementation, the module, functionality, or logic represents program code that performs specified tasks when executed on a processor (e.g., CPU or CPUs). The program code may be stored in one or more computer-readable memory devices (e.g., memory and/or one or more tangible media), and so on. The structures, functions, approaches, and techniques described in this document can be implemented on a variety of commercial computing platforms having a variety of processors.

Processors are not limited by the materials from which they are formed or the processing mechanisms employed therein. For example, the processor may be comprised of semiconductor(s) and/or transistors (e.g., electronic integrated circuits (ICs)). Memory can be included with the processor. The memory can store data, such as a program of instructions for operating multiple systems, the system and/or system components, data, and so on. Although a single memory device can be used, a wide variety of types and combinations of memory (e.g., tangible memory, non-transitory memory) may be employed, such as random access memory (RAM), hard disk memory, removable medium memory, external memory, and other types of computer-readable storage media.

In additional embodiments, a variety of system configurations may make use of the structures, techniques, approaches, and so on described herein. Thus, although a particular inspection stations are described throughout this document, a variety of checkpoint configurations may make use of the described techniques, approaches, structures, and so on. Computing devices used with the system may be configured with limited functionality (e.g., thin devices) or with robust functionality (e.g., thick devices). Thus, a device's functionality may relate to the device's software or hardware resources, e.g., processing power, memory (e.g., data storage capability), analytical ability, and so on.

Moreover, the computer controlling the system may be configured to communicate with a variety of different networks. For example, the networks may include the Internet, a cellular telephone network, a local area network (LAN), a wide area network (WAN), a wireless network, a public telephone network, an intranet, and so on. For example, recommendations are communicated to mobile phone (e.g., a smart phone) associated with a manager.

In certain embodiments, the systems and methods of the present invention further comprise a local viewing station that, for example, may be employed depending on operational parameters. For example, in some embodiments, a local viewing station is employed to supplement or replace at least one remote viewing station. In other embodiments, a local viewing station is employed, for example, depending on network availability and/or network processing speed. In further embodiments, the local viewing station is employed in case of failure in the system such that the remote viewing station is not reachable (e.g., network connection failure, no operators present at the remote viewing station, etc.). In such embodiments, the systems are switched automatically or manually to the local viewing station. The local viewing station could be located at or near the screening checking point. The systems of the present invention (e.g., upon failure in the network) could display the images to a local operator at the local viewing station who is able to identify any threats in the image.

All publications and patents mentioned in the present application are herein incorporated by reference. Various modification and variation of the described methods and compositions of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

We claim:

1. An inspection system comprising:
a plurality of transport bins, wherein each of said transport bins comprises a traceable tag with a unique signature, wherein said transport bins are configured for carrying passenger belongings;
an inspection unit configured to individually scan each of said plurality of transport bins to generate images of said passenger belongings, wherein each of said images is associated with a unique signature from said traceable tag;
a conveyor system extending through said inspection unit for conveying said transport bins through said inspection unit;
a deposit point located ahead of said conveyer;
a retrieval point located behind said conveyor;
a computer system configured to: transmit said images and said unique signature to a remote inspection station; receive information from said remote inspection station that identifies a threat in said images; monitor transport bin flow through said deposit and retrieval points; identify presence of, number of, and/or location of one or more modular components located in said conveyor system, said deposit point, said retrieval point; and adjust one or more system performance parameters based on said presence of, number of, and/or location of said modular components, wherein said computer system manages transfer of said images to said remote inspection station based on reviewer workflow.

2. The system of claim 1, wherein said traceable tag comprises an RFID tag.

3. The system of claim 1, further comprising a return conveyor for the transport bins arranged next to or below the conveyor passing through the inspection station, the return conveyor extending to the area of the deposit point ahead of the conveyor.

4. The system of claim 1, further comprising a recheck station.

5. The system of claim 1, wherein said conveyor system further comprises a bin diversion system configured to automatically divert said transport bins identified as suspicious to said recheck station.

6. The system of claim 1, wherein said computer system transfers an image to a second reviewer if a first reviewer is occupied with a previous image.

7. An inspection system comprising:
a plurality of transport bins, wherein each of said transport bins comprises a traceable tag with a unique signature, wherein said transport bins are configured for carrying passenger belongings;
an inspection unit configured to individually scan each of said plurality of transport bins to generate images of said passenger belongings, wherein each of said images is associated with a unique signature from said traceable tag;
a conveyor system extending through said inspection unit for conveying said transport bins through said inspection unit;
a deposit point located ahead of said conveyor;
a retrieval point located behind said conveyor;
a computer system configured to: transmit said images and said unique signature to a remote inspection station; receive information from said remote inspection station that identifies a threat in said images; monitor transport bin flow through said deposit and retrieval points; identify presence of, number of, and/or location of one or more modular components located in said conveyor system, said deposit point, said retrieval point and adjust one or more system performance parameters based on said presence of, number of, and/or location of said modular components, wherein said computer system is configured to adjust image transmission parameters to remote inspection stations in response to changes in bin flow.

8. The system of claim 7, further comprising a return conveyor for the transport bins arranged next to or below the conveyor passing through the inspection station, the return conveyor extending to the area of the deposit point ahead of the conveyor.

9. The system of claim 7, wherein said conveyor system further comprises a bin diversion system configured to automatically divert said transport bins identified as suspicious to said recheck station.

10. A computer system for managing a passenger checkpoint comprising:
a computer processor, and
computer memory, wherein said computer memory comprises a software application configured for processing images from a passenger check point which comprises a plurality of inspection systems and a remote viewing station; wherein said processing images by said software application comprises:
receiving said images from said plurality of inspection systems,
storing said images, and
one or more or all of additional functionalities selected from:
transmitting said images to a plurality of human screeners at said remote viewing station such that the next available human screener receives the next available image regardless of which of said plurality of inspection systems generated said image;
receiving images from said remote viewing station and transmitting said images to said recheck station, wherein said images have been marked-up at said remote viewing station to identify suspicious items;
identifying presence of, number of, and/or location of one or more modular components located associated with said inspection system;
adjusting one or more system performance parameters based on presence of, number of, and/or location of modular components associated with said inspection system; and
managing image transmission parameters to remote inspection stations in response to changes in bin flow through said inspection system.

11. A decision support system comprising a security checkpoint and a computer system:
wherein said security checkpoint comprises a plurality of inspection systems configured for screening belongings, wherein each of said inspection systems comprises:
a plurality of transport bins, wherein said transport bins are configured for carrying passenger belongings;
an inspection unit configured to individually scan each of said plurality of transport bins and said passenger bags to generate images;
a conveyor system extending through said inspection unit for conveying said transport bins and said passenger bags through said inspection unit;
a deposit point located ahead of said conveyor;
a retrieval point located behind said conveyor; and
an operator notification device; and
wherein said computer system comprises a processor and memory component, wherein said memory component comprises a software application configured to:
collect information from each of said plurality of inspection systems as to the number of transport bins passed through each of said inspection systems;
process said number information to generate throughput data comprising the rate at which said passenger bags and transport bins are being passed through each of said plurality of inspection systems; and
transmit said throughput data to said operator notification device.

12. The decision support system of claim 11, wherein said information is generated by said inspection unit.

13. The decision support system of claim 11, wherein each of said plurality of inspection systems comprises at least one sensor configured to detect the number of transport bins and passenger bags passing through said inspection systems, and wherein said number information is generated by said at least one sensor.

14. The decision support system of claim 13, wherein each of said plurality of transport bins comprises a traceable tag with a unique signature, and said at least one sensor is configured to detect said unique signature.

15. The decision support system of claim 13, wherein said security checkpoint further comprises a remote viewing station configured to allow human viewers to review said images generated by said inspection unit.

16. The decision support system of claim 14, wherein said software application is further configured to:
collect review information from said remote viewing station as to the number of said images reviewed by said human screeners and number of un-reviewed images;

process said review information generate image review data comprising the rate at which said images are processed by said remote viewing station;

process said image review data in combination with said throughput data to generate review capacity data; and transmit said review capacity data to said operator notification device.

17. The decision support system of claim 16, wherein said review capacity data indicates a bottleneck, or potential future bottleneck, at said one or more inspection systems due to too few human viewers.

18. The decision support system of claim 16, wherein said review capacity data indicates an over-capacity, or potential future over-capacity, of human viewers at said remote viewing system.

19. The decision support system of claim 16, wherein said review capacity data provides a recommendation to conduct an amelioratory action selected from the group consisting of:

adding or removing human viewers from said remote viewing station, opening or closing an inspection system, redirecting passenger flow, adjusting length of inspection system, and reassigning personnel.

20. The decision support system of claim 11, wherein said software application is further configured to:

collect waiting passenger information from each of said plurality of inspection systems;

process said waiting passenger information in combination with said throughput data to generate expected flow-through data; and transmit said expected flow-through data to said operator notification device.

21. The decision support system of claim 20, wherein said expected flow-through data comprises recommendations for diverting passengers from one of said inspections systems to another.

22. The decision support system of claim 11, wherein said throughput data further comprises recommendations regarding the closure or addition of one or more of said plurality of inspection systems.

23. The decision support system of claim 22, wherein said recommendation is based, at least in part, on at least one of the following:

i) exceeding a threshold level of inspection system capacity, and ii) stored prior performance outcome data.

24. The decision support system of claim 11, wherein said throughput data further comprises recommendations or warnings regarding increased or decreased needs for personnel.

25. The decision support system of claim 24, wherein said recommendation is based, at least in part, on one or more of the following:

i) stored prior performance outcome data, and ii) exceeding a threshold level of personnel capacity.

* * * * *